(12) United States Patent
Wang et al.

(10) Patent No.: US 11,598,360 B2
(45) Date of Patent: Mar. 7, 2023

(54) FASTENING CLIP

(71) Applicant: ILLINOIS TOOL WORKS INC., Glenview, IL (US)

(72) Inventors: Xing Wang, Shanghai (CN); Mengli Sun, Shanghai (CN)

(73) Assignee: Illinois Tool Works Inc., Glenview, IL (US)

(*) Notice: Subject to any disclaimer, the term of this patent is extended or adjusted under 35 U.S.C. 154(b) by 344 days.

(21) Appl. No.: 16/896,775

(22) Filed: Jun. 9, 2020

(65) Prior Publication Data

US 2020/0392974 A1 Dec. 17, 2020

(30) Foreign Application Priority Data

Jun. 14, 2019 (CN) .......................... 201910514226.6
Apr. 29, 2020 (CN) ........................ 202010356940.X

(51) Int. Cl.
*F16B 21/08* (2006.01)
*F16B 5/06* (2006.01)
*F16B 21/07* (2006.01)

(52) U.S. Cl.
CPC .......... *F16B 21/086* (2013.01); *F16B 5/0642* (2013.01); *F16B 21/076* (2013.01)

(58) Field of Classification Search
CPC .... F16B 21/076; F16B 21/084; F16B 21/086; F16B 5/0642; F16B 19/1081
See application file for complete search history.

(56) References Cited

U.S. PATENT DOCUMENTS

| | | | | |
|---|---|---|---|---|
| 4,396,329 A * | 8/1983 | Wollar | .................. | F16B 21/084 411/452 |
| 4,704,059 A * | 11/1987 | Nakama | ................ | F16B 37/043 411/510 |
| 4,840,523 A * | 6/1989 | Oshida | ................ | F16B 19/1081 411/908 |
| 6,514,024 B2 * | 2/2003 | Akema | ................ | F16B 19/1081 411/908 |
| 7,186,068 B2 * | 3/2007 | Zoubek | ................. | F16B 21/086 411/510 |
| 7,862,272 B2 * | 1/2011 | Nakajima | .............. | F16B 21/084 411/48 |
| 8,177,179 B2 * | 5/2012 | Bard | ......................... | G01K 1/14 248/222.12 |
| 10,830,270 B2 * | 11/2020 | Lepper | .................. | F16B 21/086 |
| 2005/0123372 A1 * | 6/2005 | Sato | .................... | F16B 19/1081 411/32 |
| 2011/0164946 A1 * | 7/2011 | Busch | ................. | F16B 19/1081 411/502 |

FOREIGN PATENT DOCUMENTS

WO WO-2009012947 A1 * 1/2009 .......... F16B 19/1081

* cited by examiner

*Primary Examiner* — Matthew R McMahon
(74) *Attorney, Agent, or Firm* — Quarles & Brady LLP

(57) ABSTRACT

The present application provides a fastening clip, which comprises a fastening pin and a fastening sleeve. The fastening pin can be inserted into the fastening sleeve, the fastening sleeve comprises a base and two pairs of retaining wings, the two pairs of retaining wings respectively extend downward from a lower surface of the base, and outer sides of at least one of the two pairs of retaining wings have raised ribs extending in a circumferential direction. The fastening clip of the present application can firmly fasten at least two plates.

20 Claims, 11 Drawing Sheets

FASTENING CLIP

CROSS REFERENCES TO RELATED APPLICATIONS

This application claims priority to Chinese Application Serial No. 201910514226.6, filed Jun. 14, 2019, and Chinese Application Serial No. 202010356940.X, filed Apr. 29, 2020, the contents of which are incorporated herein by reference in their entirety.

TECHNICAL FIELD

The present application relates to a fastening clip, particularly a fastening clip for fastening two or more plates.

BACKGROUND ART

In industrial applications, for example, in the automobile industry, it is sometimes desirable to use a fastening clip to fixedly connect two or more plates. One of the solutions is to punch holes in the plates to be connected, and insert the fastening clip into the holes of the plates to be connected. The fastening clip has an elastic fixing component. The elastic fixing component is in a contracted state before being inserted into the plates to be connected. When being completely inserted into the plates to be connected, the elastic fixing component is expanded outward to abut against the plates, so that the two or more plates are fixedly connected.

SUMMARY OF THE INVENTION

The present application provides an easy-to-mount and firm fastening clip, the fastening clip comprising:
a fastening pin having a head part and a pin part, the pin part extending downward from the head part, and a distal end of the pin part forming a retaining part;
a fastening sleeve comprising a base and two pairs of retaining wings, wherein each pair of retaining wings is arranged opposite to each other, the base is provided with a hole, the pin part can be detachably inserted into the hole, the two pairs of retaining wings respectively extend downward from the lower surface of the base and are circumferentially distributed around the center of the hole, and the inner side of the lower part of each of the two pairs of retaining wings is inclined inward to form a clamping part for cooperating with the retaining part of the fastening pin;
wherein the outer sides of at least one of the two pairs of retaining wings have raised ribs extending in a circumferential direction.

According to the fastening clip, the two pairs of retaining wings comprise a first pair of retaining wings and a second pair of retaining wings, the first pair of retaining wings is provided with raised ribs adjacent to upper ends of the first pair of retaining wings, and the second pair of retaining wings is provided with raised ribs adjacent to lower ends of the second pair of retaining wings.

According to the fastening clip, the raised ribs at the upper ends of the first pair of retaining wings are arranged to contact at least two plates of a first thickness so as to fasten the at least two plates of the first thickness to each other by the fastening clip, and the raised ribs at the lower ends of the second pair of retaining wings are arranged to contact at least two plates of a second thickness so as to fasten the at least two plates of the second thickness to each other by the fastening clip.

According to the fastening clip, the clamping parts of the second pair of the two pairs of retaining wings are provided as follows: on the same radial section, the thickness of the clamping parts of the second pair of retaining wings is smaller than the thickness of the clamping parts of the first pair of retaining wings.

According to the fastening clip, on the same radial section, the distance between the outer sides of the clamping parts of the first pair of the two pairs of retaining wings is smaller than the distance between the outer sides of the clamping parts of the second pair of retaining wings, and the distance between inner surfaces of the clamping parts of the first pair of retaining wings of the two pairs of retaining wings is greater than the distance between inner surfaces of the clamping parts of the second pair of retaining wings.

According to the fastening clip, claws are arranged on the inner sides of the clamping parts to abut against the retaining part, and the raised ribs at the lower ends of the second pair of retaining wings are located above the claws.

According to the fastening clip, the raised ribs at the upper ends of the first pair of retaining wings have a distance D from the lower surface of the base.

According to the fastening clip, the raised ribs have upper bevels inclined downward and outward.

According to the fastening clip, the raised ribs comprise two raised ribs arranged side by side.

According to the fastening clip, a guide rib is arranged on the outer side of the pin part, a guide groove is provided in the hole, and when the pin part is inserted into the hole, the guide rib is located in the guide groove, so that the fastening pin cannot rotate relative to the fastening sleeve.

The fastening clip in the present application can adapt to plates of different thicknesses, so that when the fastening clip clamps at least two thin plates of a first thickness, the fastening force of the fastening clip to the at least two plates is improved to prevent the two plates from shaking. When at least two thick plates of a second thickness are fastened with the fastening clip, there is a relatively small insertion force while the fastening force is guaranteed to meet the requirements.

DETAILED DESCRIPTION OF EMBODIMENTS

Figure 1A:
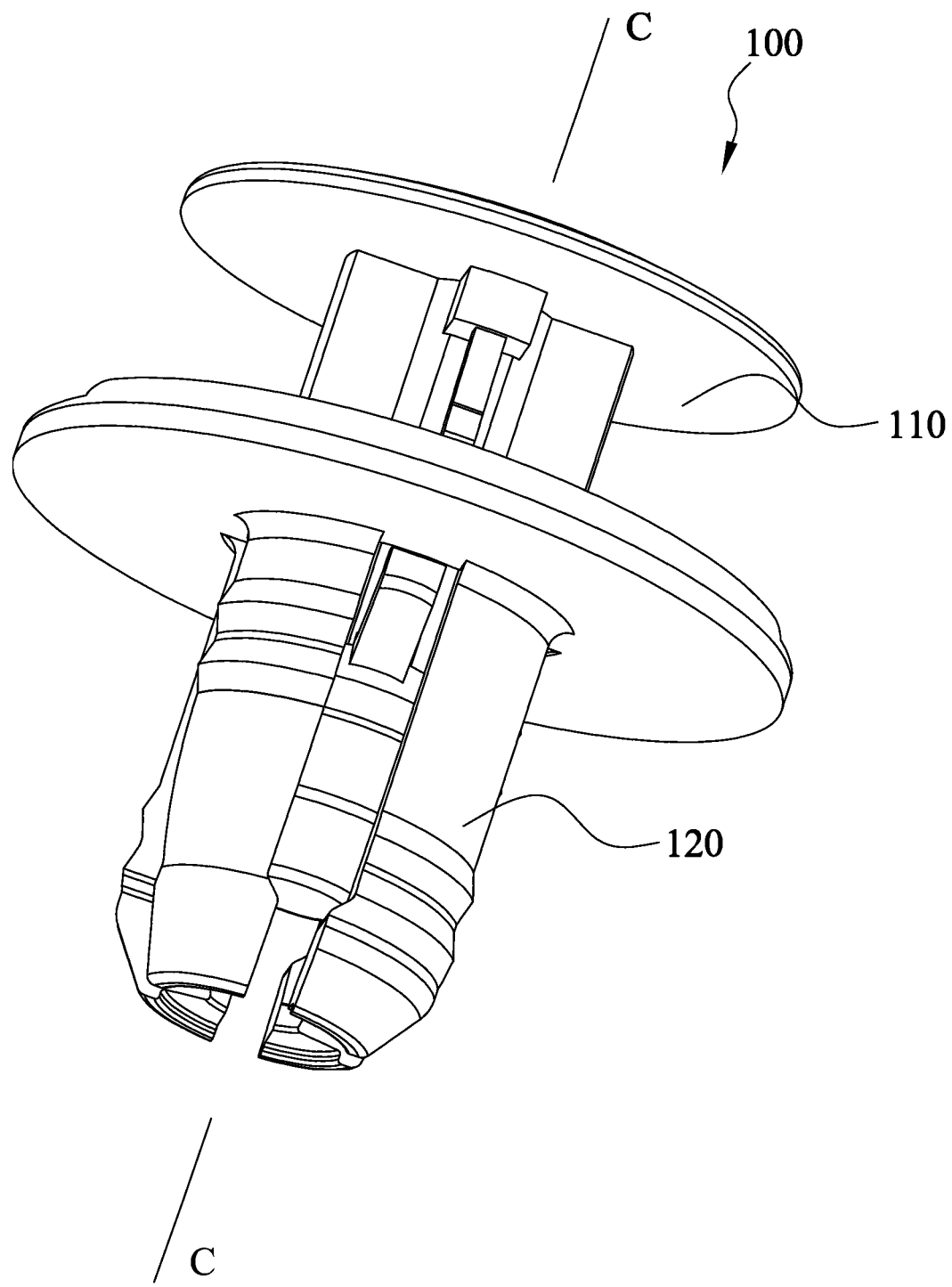
FIG. 1A is a perspective view of a fastening clip according to the present application.

Various particular embodiments of the present invention are described below with reference to the accompanying drawings which constitute part of this description. It should be understood that although the terms such as "front", "rear", "upper", "lower", "left", and "right" indicating directions in the present application are used to describe various exemplary structural parts and elements in the present application, these terms used herein are merely used for ease of description and are determined based on the exemplary orientation shown in the accompanying drawings. Since the embodiments disclosed in the present application can be arranged in different directions, these terms indicating directions are only illustrative and should not be considered as limitations. If possible, the same or similar reference numerals used in the present application refer to the same components.

Figure 1B:
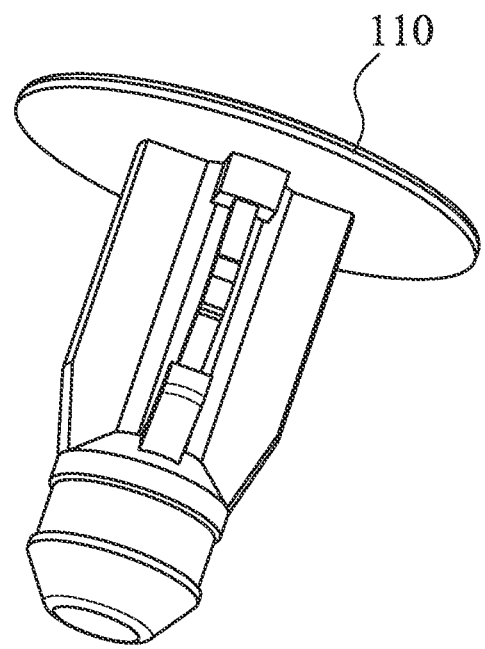
FIG. 1B is an exploded view of the fastening clip in FIG. 1A.
Figure 1B:
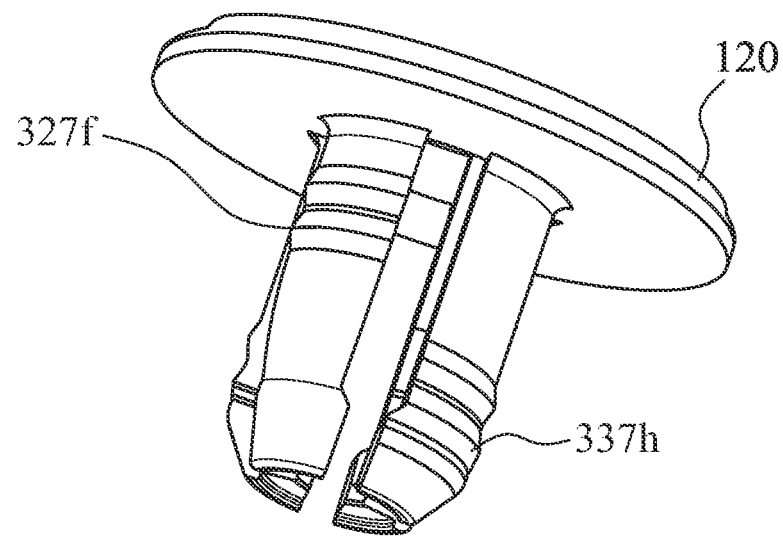

FIG. 1A is a perspective view of a fastening clip according to the present application, and FIG. 1B is an exploded view of the fastening clip in FIG. 1A. As shown in FIG. 1A and FIG. 1B, a fastening clip 100 is used to fasten two or more overlapped plates. The fastening clip 100 comprises a fastening pin 110 and a fastening sleeve 120. The fastening clip 100 has a central axis C. The fastening pin 110 can be inserted into the fastening sleeve 120 and move in the direction of the central axis relative to the fastening sleeve 120. The fastening clip 100 has a ready position and a working position. FIG. 1A shows the ready position of the fastening clip 100. The fastening pin 110 is continuously pressed toward the fastening sleeve 120 to reach the working position of the fastening clip 100. At the ready position of the fastening clip 100, the fastening clip 100 can be inserted into holes of at least two plates to be fastened. At the working position of the fastening clip 100, the fastening clip 100 fastens the at least two plates. The structure and working process of the fastening pin 110 and the fastening sleeve 120 will be described in detail below.

Figure 2A:
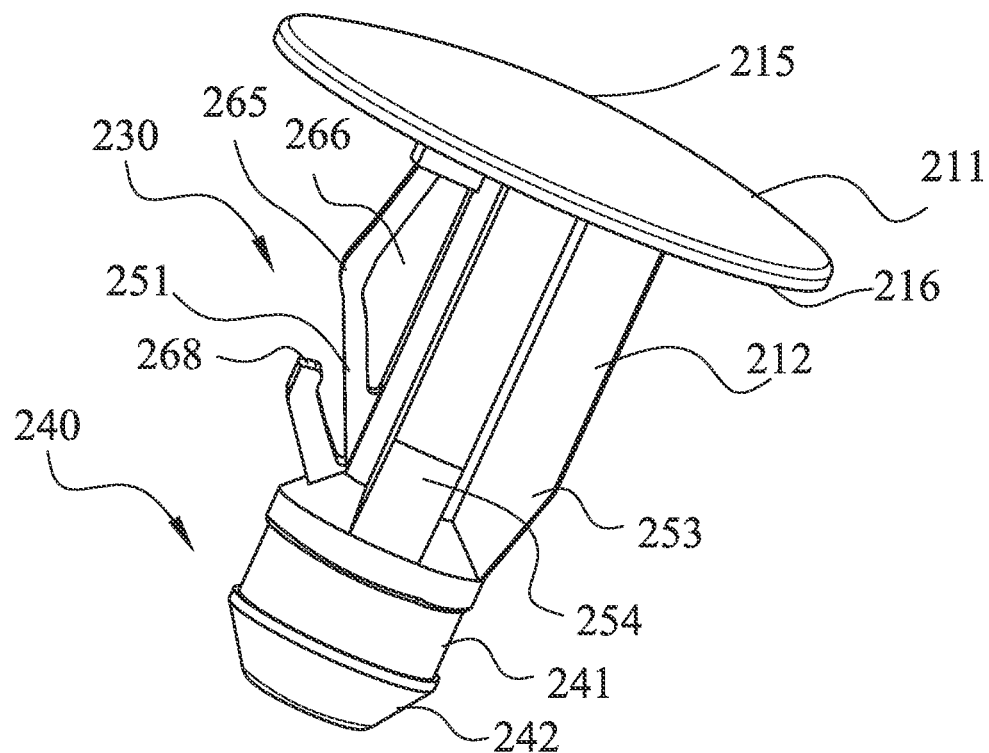
FIG. 2A is a perspective view of a fastening pin in FIG. 1B.
Figure 2B:
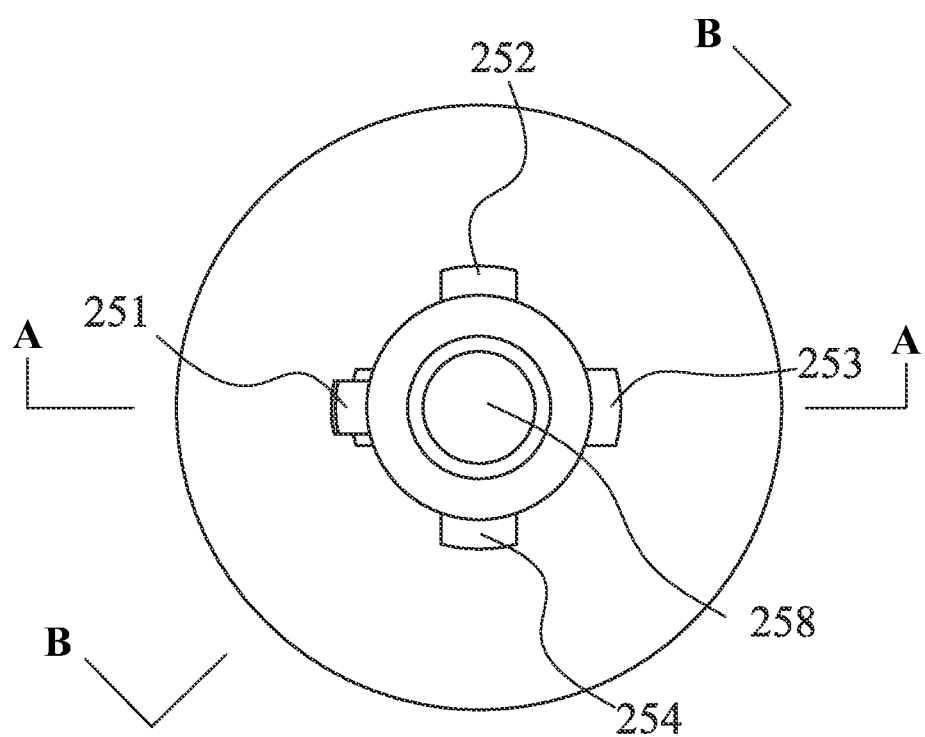
FIG. 2B is a bottom view of the fastening pin in FIG. 1B.
Figure 2C:
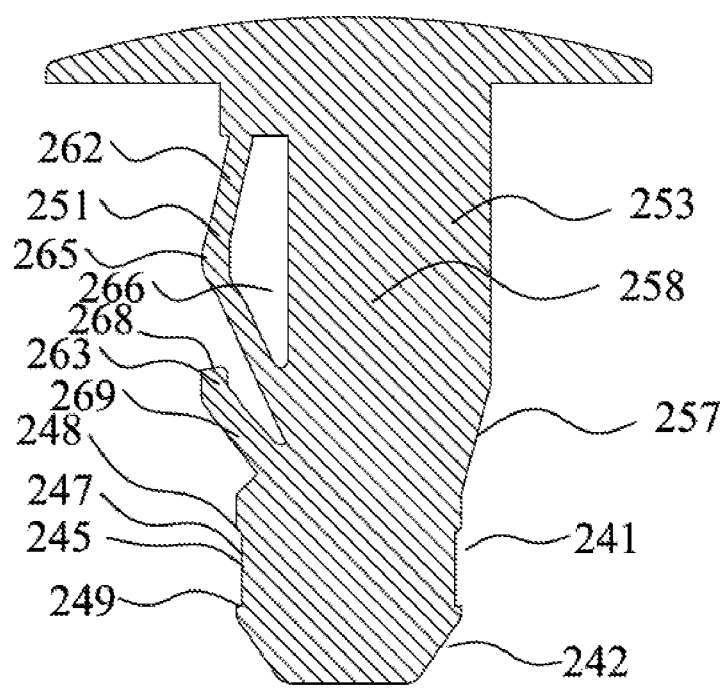
FIG. 2C is a cross-sectional view of the fastening pin taken along line A-A in FIG. 2B.
Figure 2D:
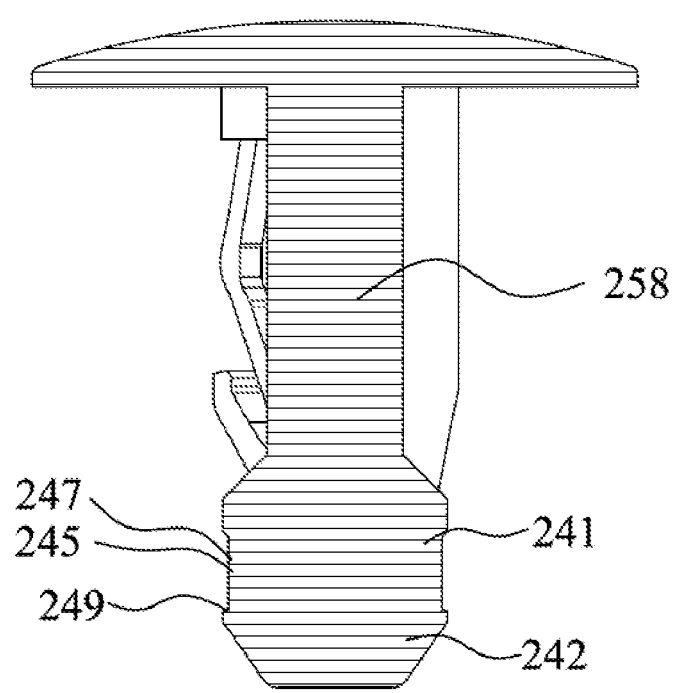
FIG. 2D is a cross-sectional view of the fastening pin taken along line B-B in FIG. 2B.

FIG. 2A is a perspective view of the fastening pin in FIG. 1B, FIG. 2B is a bottom view of the fastening pin in FIG. 1B, FIG. 2C is a cross-sectional view of the fastening pin taken along line A-A in FIG. 2B, and FIG. 2D is a cross-sectional view of the fastening pin taken along line B-B in FIG. 2B. As shown in FIG. 2A to FIG. 2D, the fastening pin 110 comprises a head part 211 and a pin part 212. The head part 211 is substantially disc-shaped and has an upper surface 215 and a lower surface 216, and the pin part 212 extends downward from the lower surface 216 of the head part 211. The outer diameter of the head part 211 is larger than the outer diameter of the pin part 212, so that the fastening pin 110 is substantially in the shape of an open umbrella.

As shown in FIG. 2A to FIG. 2C, the pin part 212 has an upper section 230 and a lower section 240, the upper section 230 is connected to the head part 211, and the lower section 240 is located at a distal end of the pin part 212. The lower section 240 comprises a retaining part 241 and a fastening pin guide part 242, wherein the retaining part 241 comprises a groove 245 recessed from an outside surface to the inside. The groove 245 comprises a groove bottom 247, an upper side wall 248 and a lower side wall 249, wherein the upper side wall 248 extends obliquely upward and outward from the groove bottom 247, so that an included angle between the upper side wall 248 and the groove bottom 247 is an obtuse angle. The lower side wall 249 extends outward perpendicular to the groove bottom 247, so that an included angle between the lower side wall 249 and the groove bottom 247 is a right angle. The fastening pin guide part 242 is located at a distal end of the lower section 240, and an outer side of the fastening pin guide part 242 is inclined inward from top to bottom to form an inverted cone structure. The fastening pin guide part 242 is used to guide the insertion of the fastening pin 110 into the fastening sleeve 120. Referring to FIG. 2A to FIG. 2C, the upper section 230 has a central column 258 and four guide ribs 251, 252, 253, 254, and the four guide ribs 251, 252, 253, 254 are used to cooperate with the fastening sleeve 120 to prevent the fastening pin 110 from rotating relative to the fastening sleeve 120. The four guide ribs 251, 252, 253, 254 respectively extend in an axial direction of the upper section 230. The four guide ribs 251, 252, 253, 254 respectively protrude outward from an outer surface of the central column, and are distributed circumferentially along the central axis C of the fastening clip 100. The guide ribs 252, 253, 254 have the same structure and are substantially elongated, and the distance from an outer side of each of the guide ribs 252, 253, 254 to the central axis C is greater than the distance from an outer side of the lower section 240 of the pin part 212 to the central axis. The outer side of a lower part of each of the guide ribs 252, 253, 254 is inclined inward from top to bottom to form a transition part 257, and the transition part 257 is connected to the lower section 240 of the pin part 212. The guide rib 251 has an upper part 262 and a lower part 263. The upper part 263 has a raised part 265 and a hollowed part 266, wherein the raised part 265 protrudes outward. The hollowed part 266 is located inside the raised part 265. The hollowed part 266 enables the upper part 263 to deform to a certain extent. When an external force is applied to an outer side of the raised part 265, the raised part 265 can contract inward by extruding the hollowed part 266. The lower part 263 extends upward and outward from the junction of the upper section 230 and the lower section 240 to form an elastic arm 269, and the elastic arm 269 is used to prevent the fastening pin 110 from coming off the fastening sleeve 120. An upper end of the elastic arm 269 extends vertically upward, and a top surface of the upper end of the elastic arm 269 forms a contact surface 268.

Figure 3A:
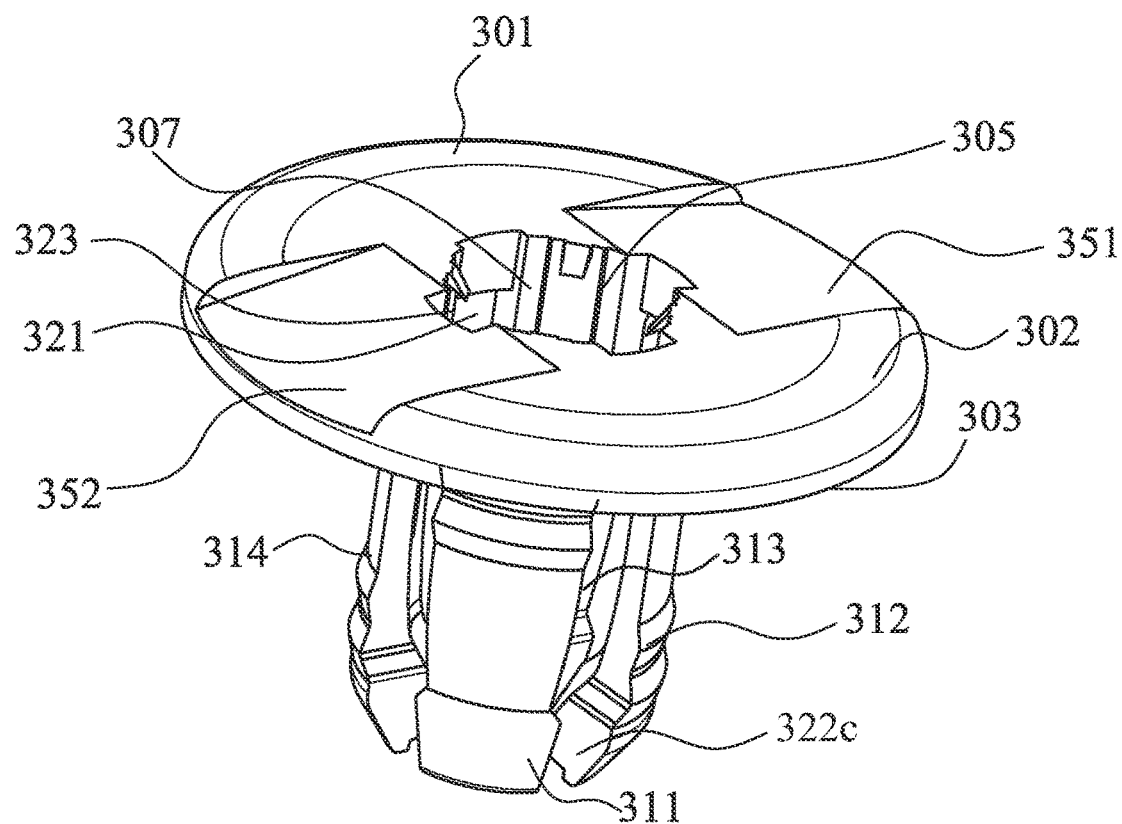
FIG. 3A is a perspective view of a fastening sleeve in FIG. 1B.
Figure 3B:
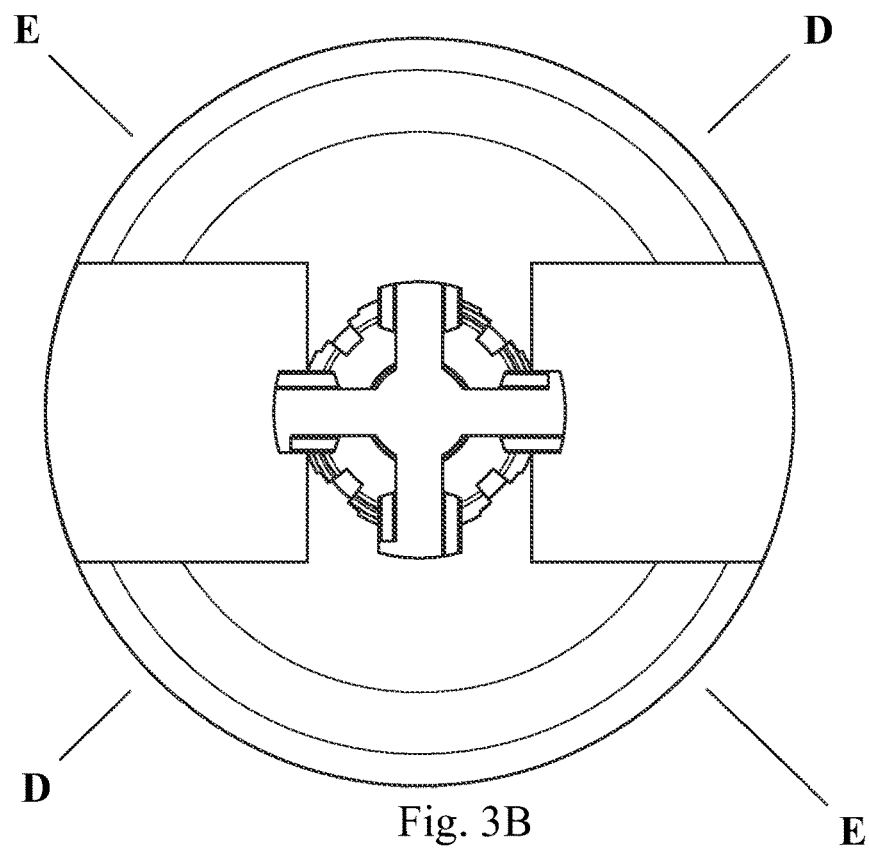
FIG. 3B is a top view of the fastening sleeve in FIG. 1B.

FIG. 3A is a perspective view of the fastening sleeve 120, and FIG. 3B is a top view of the fastening sleeve 120 in FIG. 3A. As shown in FIG. 3A and FIG. 3B, the fastening sleeve 120 comprises a base 301 and two pairs of retaining wings 311, 312, 313, 314, and the base 301 is substantially disc-shaped and has an upper surface 302 and a lower surface 303. The two pairs of retaining wings 311, 312, 313, 314 are formed by extending downward from the lower surface 303 of the base 301. The center of the base 301 has a hole 305 penetrating the upper surface 302 and the lower surface 303 of the base for inserting the fastening pin 110. The center of the hole 305 is located on the central axis C of the fastening clip 100. The hole 305 comprises a central part 307 and four raised parts 321 protruding outward around the central part 307, the four raised parts 321 form four guide grooves 323, and the guide grooves 323 are distributed circumferentially along the center of the hole 305 for receiving the four guide ribs 251, 252, 253, 254 of the fastening pin 110. The shapes of the four guide grooves 323 match the shapes of the four guide ribs 251, 252, 253, 254. After the four guide ribs 251, 252, 253, 254 are inserted into the four guide grooves 323, respectively, the fastening pin 110 cannot rotate relative to the fastening sleeve 120. The upper surface 302 of the base 301 further has a pair of opposite recesses 351, 352, and the recesses 351, 352 are formed by inclining outward and downward from the edge of the hole 305. When the fastening clip 100 reaches the working position, the lower surface 216 of the head part 211 of the fastening pin 110 is close to the upper surface 302 of the base 301, and the recesses 351, 352 enable an operating space between the lower surface 216 of the head part 211 of the fastening pin 110 and the upper surface 302 of the base 301 to facilitate the insertion of a tool into the operating space so as to pull out the fastening pin 110. When the fastening clip 100 needs to be removed from the fastened plates, an operating tool is inserted into the operating space between the recesses 351, 352 of the fastening sleeve 120 and the lower surface 216 of the head part 211 of the fastening pin 110, the fastening pin 110 is pulled out upward, so that the fastening clip 100 returns to the ready position, and thus the fastening clip 100 can be removed. The two pairs of retaining wings 311, 312, 313, 314 of the fastening sleeve 120 are made of a material having certain elasticity, so that the fastening sleeve 120 can deform to a certain extent.

The two pairs of retaining wings 311, 312, 313, 314 comprise a first pair of retaining wings 311, 313 and a second pair of retaining wings 312 and 314. The first pair of retaining wings 311 and 313 have the same structure and are symmetrically arranged relative to the central axis C of the fastening clip 100, and the connecting line of the center lines of the first pair of retaining wings 311 and 313 passes through the central axis. Similarly, the second pair of retaining wings 312 and 314 have the same structure and are symmetrically arranged relative to the central axis, and the connecting line of the center lines of the second pair of retaining wings 312 and 314 passes through the central axis. The two pairs of retaining wings 311, 312, 313, 314 are uniformly distributed around the central axis C of the fastening clip 100, that is, the connecting line of the center lines of the first pair of retaining wings 311 and 313 is perpendicular to the connecting line of the center lines of the second pair of retaining wings 312 and 314.

Figure 3C:
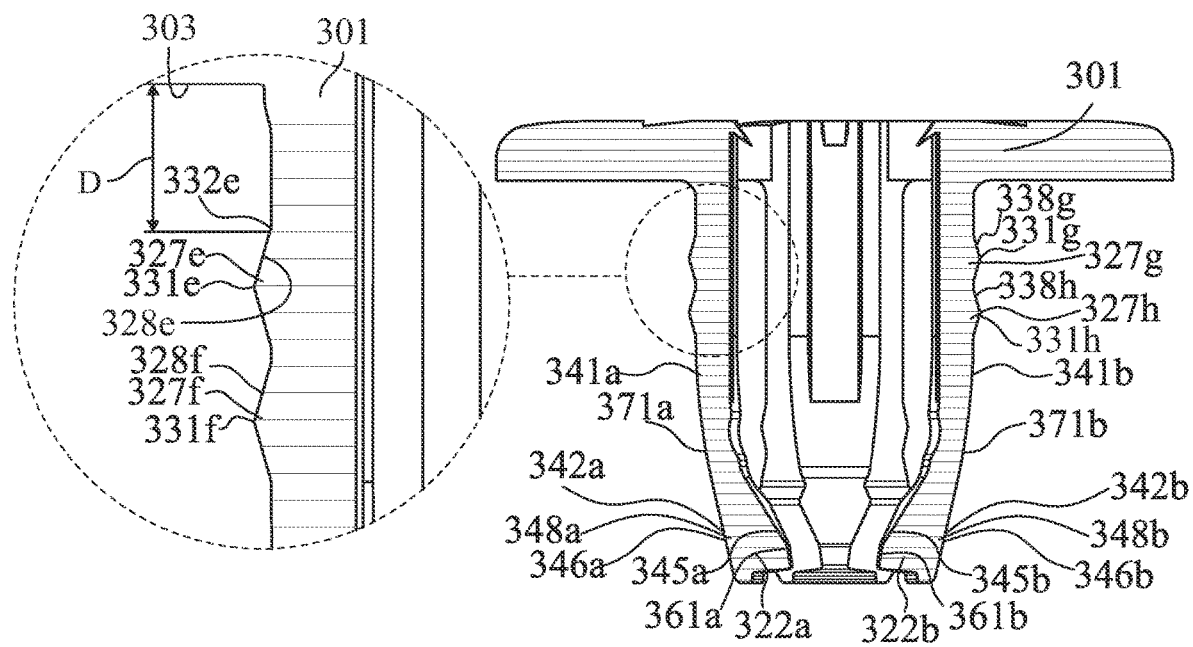
FIG. 3C is a cross-sectional view of the fastening sleeve taken along line D-D in FIG. 3B.

FIG. 3C is a cross-sectional view taken along line D-D in FIG. 3B, showing the structures of the first pair of retaining wings 311, 313. Since the retaining wings 311 and 313 are of symmetrical structures, the specific structure of the first pair of retaining wings 311, 313 will be described below by taking the retaining wing 311 as an example. As shown in FIG. 3A and FIG. 3C, the retaining wing 311 comprises a retaining wing upper part 341a and a retaining wing lower part 342a, wherein the retaining wing upper part 341a is connected to the lower surface 303 of the base 301, and the retaining wing lower part 342a is located at a distal end of the retaining wing 311. The retaining wing upper part 341a extends downward from the lower surface 303 of the base 301 and is substantially perpendicular to the base 301. An outer side 371a of the retaining wing upper part 341a has two raised ribs 327e, 327f extending in a circumferential direction, and the two raised ribs 327e, 327f are located at the end of the retaining wing upper part 341a close to the base 301, that is, at a proximal end of the retaining wing upper part 341a relative to the base 301. The raised rib 327e is located above the raised rib 327f. In other embodiments, there may also be one or more raised ribs. The raised rib 327e has an upper bottom 332e and a top 331e successively from top to bottom, the raised rib 327e smoothly transits from the upper bottom 332e to the top 331e to form an upper bevel 328e, and the upper bevel 328e is used to abut against at least two plates of a first thickness. The upper bottom 332e of the raised rib 327e has a distance D from the lower surface 303 of the base 301, and the distance D is set to be not greater than the total thickness of the two plates. Similarly, the raised rib 327f below the raised rib 327e also has an upper bevel 328f.

The thickness of at least part of the retaining wing lower part 342a is greater than the thickness of the retaining wing upper part 341a. An outer side 346a of the lower part of the retaining wing lower part 342a is inclined inward from top to bottom to form an inverted-cone fastening sleeve guide part 348a, and the fastening sleeve guide part 348a is used to guide the insertion of the fastening clip 100 into two or more plates (not shown in the figures) to be fastened. An inner side 345a of the lower part of the retaining wing lower part 342a is inclined inward from top to bottom to form a clamping part 322a, and the clamping part 322a is used to cooperate with the retaining part 241. A claw 361a is formed at the lower part of the inner side of the clamping part 322a, and the claw 361a can enter the groove 245 of the retaining part 241 of the fastening pin 110.

Like the retaining wing 311, the retaining wing 313 comprises a retaining wing upper part 341b and a retaining wing lower part 342b. An outer side 371b of the retaining wing upper part 341b also has two raised ribs 327g, 327h, wherein the raised rib 327g is located above the raised rib 327h, the raised rib 327g is symmetrical to the raised rib 327e, and the raised rib 327h is symmetrical to the raised rib 327f. The raised rib 327g has an upper bevel 328g and a top 331g, and the raised rib 327h has an upper bevel 328h and a top 331h. An outer side 346b of the retaining wing lower part 342b comprises a fastening sleeve guide part 348b. An inner side 345b of the retaining wing lower part 342b comprises a clamping part 322b, and a claw 361b is formed at the lower part of the inner side of the clamping part 322b.

Figure 3D:
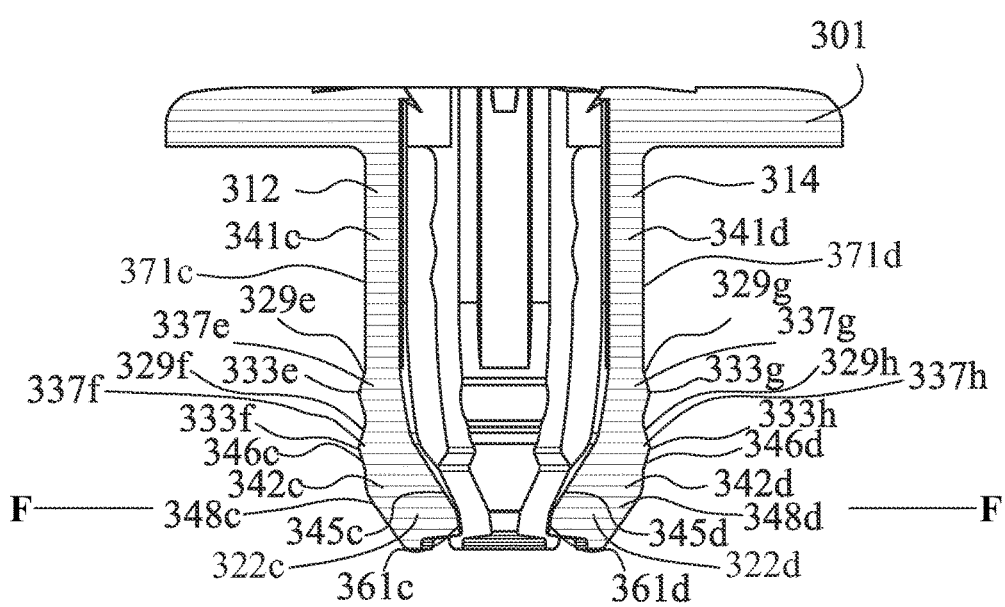
FIG. 3D is a cross-sectional view of the fastening sleeve taken along line E-E in FIG. 3B.

FIG. 3D is a cross-sectional view taken along line E-E in FIG. 3B, showing the structures of the second pair of retaining wings 312, 314. Since the retaining wings 312 and 314 are of symmetrical structures, the specific structure of the second pair of retaining wings 312, 314 will be described below by taking the retaining wing 312 as an example. As shown in FIG. 3A and FIG. 3D, similar to the first pair of retaining wings 311, 313, the retaining wing 312 comprises a retaining wing upper part 341c and a retaining wing lower part 342c, wherein the retaining wing upper part 341c is connected to the lower surface 303 of the base 301, and the retaining wing lower part 342c is located at a distal end of the retaining wing 312. The retaining wing upper part 341c extends downward from the lower surface 303 of the base 301 and is substantially perpendicular to the base 301.

The thickness of at least part of the retaining wing lower part 342c is not smaller than the thickness of the retaining wing upper part 341c. An outer side 346c of the lower part of the retaining wing lower part 342c is inclined inward from top to bottom to form an inverted-cone fastening sleeve guide part 348c, and the fastening sleeve guide part 348c is used to guide the insertion of the fastening clip 100 into plates (not shown in the figures) to be fastened. An inner side 345c of the lower part of the retaining wing lower part 342c is inclined inward from top to bottom to form a clamping part 322c, and the clamping part 322c is used to cooperate with the retaining part 241. A claw 361c is formed at the lower part of the inner side of the clamping part 322c, and the claw 361c can enter the groove 245 of the retaining part 241 of the fastening pin 110.

An outer side 371c of the retaining wing 312 has two raised ribs 337e, 337f extending in the circumferential direction, and the two raised ribs 337e, 337f are located at the end of the retaining wing lower part 342c close to the retaining wing upper part 341c. That is, the raised rib 337e is close to the junction of the retaining wing upper part 341c and the retaining wing lower part 342c. The two raised ribs 337e, 337f are arranged to be higher than the claw 361c. Similarly, the two raised ribs 337e, 337f have tops 333e, 333f, and upper bevels 329e, 329f, respectively, and the upper bevels 329e, 329f are used to abut against at least two plates of a second thickness.

Like the retaining wing 312, the retaining wing 314 comprises a retaining wing upper part 341d and a retaining wing lower part 342d. An outer side 371d of the retaining wing lower part 342d also has two raised ribs 337g, 337h, wherein the raised rib 337g is located above the raised rib 337h, the raised rib 337g is symmetrical to the raised rib 337e, and the raised rib 337h is symmetrical to the raised rib 337f. The raised rib 337g has an upper bevel 329g and a top 333g, and the raised rib 337h has an upper bevel 329h and a top 333h. An outer side 346d of the retaining wing lower part 342b comprises a fastening sleeve guide part 348d. An inner side 345d of the retaining wing lower part 342d comprises a clamping part 322d, and a claw 361d is formed at the lower part of the inner side of the clamping part 322d.

The fastening sleeve guide parts 348a, 348b, 348c, 348d of the two pairs of retaining wings 311, 312, 313, 314 together form an inverted cone structure gradually reducing from top to bottom, and are used to guide the fastening pin 110 to be inserted into the fastening sleeve 120 and to reach the ready position of the fastening clip 100. At the ready position of the fastening clip 100, the claws 361a, 361b, 361c, 361d of the fastening sleeve 120 are located above the retaining part 241 of the fastening pin 110.

Figure 3E:
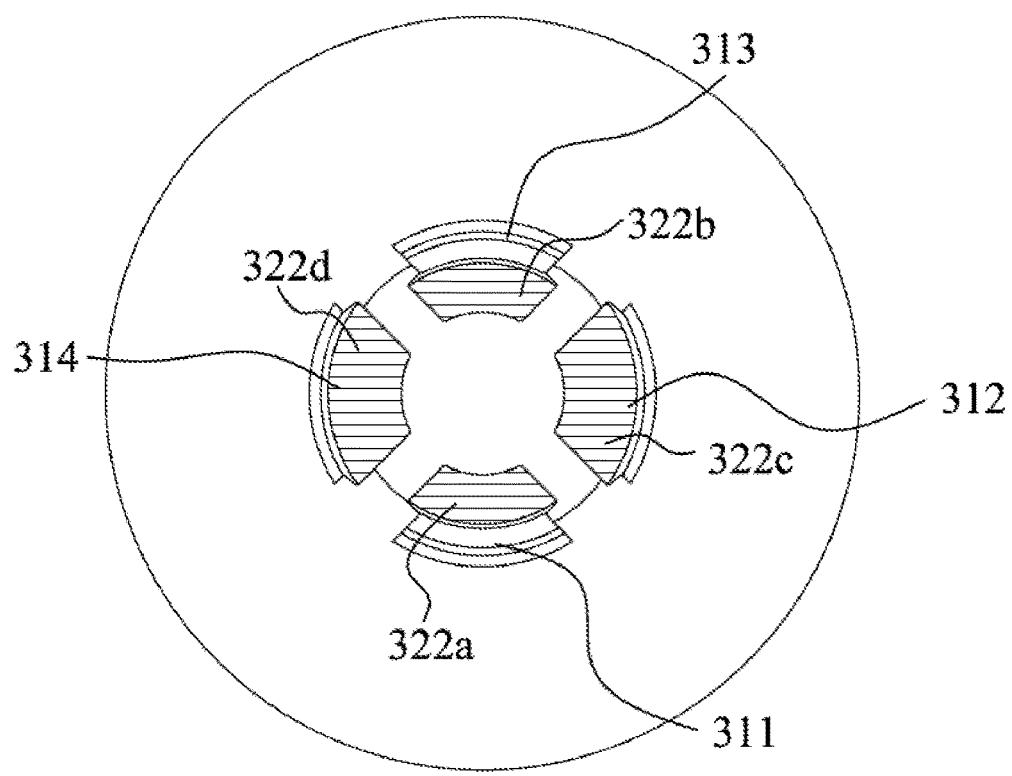
FIG. 3E is a cross-sectional view of the fastening sleeve taken along line F-F in FIG. 3D.

The thickness of at least part of the retaining wing lower part 342c of the retaining wing 312 is greater than the thickness of the corresponding part of the retaining wing lower part 342a of the retaining wing 311. That is to say, in some radial sections of the lower part of the fastening sleeve 120, the thickness of the first pair of retaining wings 311, 313 is smaller than the thickness of the second pair of retaining wings 312, 314. FIG. 3E is a cross-sectional view taken along line F-F in FIG. 3D and viewed from bottom to top. As shown in FIG. 3E, the diameter of the circumference where the inner sides of the clamping parts 322a, 322b of the first pair of retaining wings 311, 313 are located is greater than the diameter of the circumference where the inner sides of the second pair of retaining wings 312, 314 are located, and the diameter of the circumference where the outer sides of the clamping parts 322c, 322d of the first pair of retaining wings 311, 313 are located is smaller than the diameter of the circumference where the outer sides of the second pair of retaining wings 312, 314 are located. That is, on the cross-sectional view shown in FIG. 3E, the distance between the outer sides of the clamping parts 322a, 322b of the first pair of retaining wings 311, 313 is smaller than the distance between the outer sides of the clamping parts 322c, 322d of the second pair of retaining wings 312, 314, and the distance between the inner sides of the clamping parts of the first pair of retaining wings 311, 313 in the two pairs of retaining wings 311, 312, 313, 314 is greater than the distance between the inner surfaces of the clamping parts of the second pair of retaining wings 312, 314. In other words, compared to the clamping parts of the second pair of retaining wings 312, 314, the clamping parts of the first pair of retaining wings 311, 313 are thinned from the inner side and the outer side, respectively.

Referring to FIG. 1A, at the ready position of the fastening clip 100, the pin part 212 of the fastening pin 110 is partially inserted into the fastening sleeve 120, the retaining part 241 is located above the clamping parts 322a, 322b, 322c, 322d, and the diameter of a cylindrical space enclosed by each retaining wing upper part of the two pairs of retaining wings 311, 312, 313, 314 is not smaller than the outer diameter of the retaining part 241, so the retaining part 241 is close to inside surfaces of the two pairs of retaining wings 311, 312, 313, 314 or has a certain gap from the inside surfaces of the two pairs of retaining wings 311, 312, 313, 314, and the two pairs of retaining wings 311, 312, 313, 314 are in a free state and are not squeezed by external forces. At the same time, the contact surface 268 of the elastic arm 269 of the fastening pin 110 abuts against the lower surface of the base 301, thereby preventing the fastening pin 110 from sliding out of the fastening sleeve 120. The fastening clip 100 is held at the ready position before use.

Figure 4:
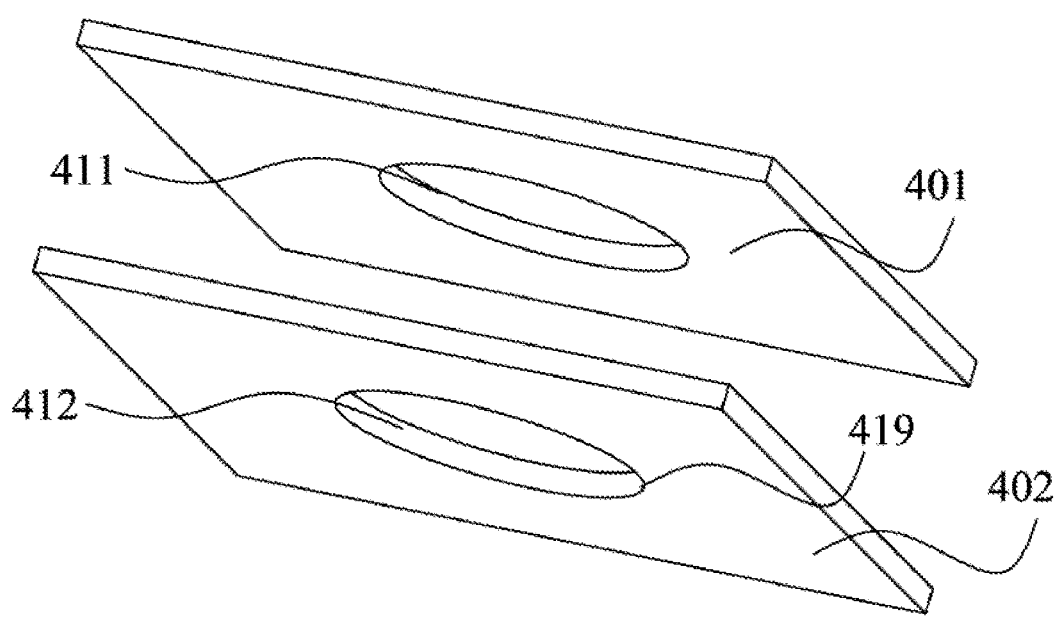
FIG. 4 is a perspective view of two plates of a first thickness being the total thickness.

FIG. 4 shows two plates of a first thickness being the total thickness. As shown in FIG. 4, the total thickness of a first plate 401 and a second plate 402 is a first thickness. The first plate 401 and the second plate 402 of the first thickness will cooperate with the raised ribs on the first pair of retaining wings 311, 313 to strengthen the fastening of the fastening clip 100 on the first plate 401 and the second plate 402. The first plate 401 and the second plate 402 have a hole 411 and a hole 412, respectively. When the plates 401 and 402 need to be fastened, the hole 411 is first aligned with the hole 412, then the fastening clip 100 in FIG. 1A is inserted into the hole 411 and the hole 412, and the fastening pin 110 is pressed down to fasten the plate 401 and the plate 402. The diameters of the hole 411 and the hole 412 are set to be equal to or slightly larger than the outer diameter of the fastening sleeve 120 of the fastening clip 100 at the ready position shown in FIG. 1A, so that the fastening clip 100 can be easily inserted into the hole 411 and the hole 412. The hole 412 of the lower second plate 402 matches the size of the fastening clip 100, so that when the fastening clip 100 is at the working position, the fastening sleeve 120 can abut against a lower edge 419 of the hole 412 to fasten the first plate 401 and the second plate 402.

Figure 5A:
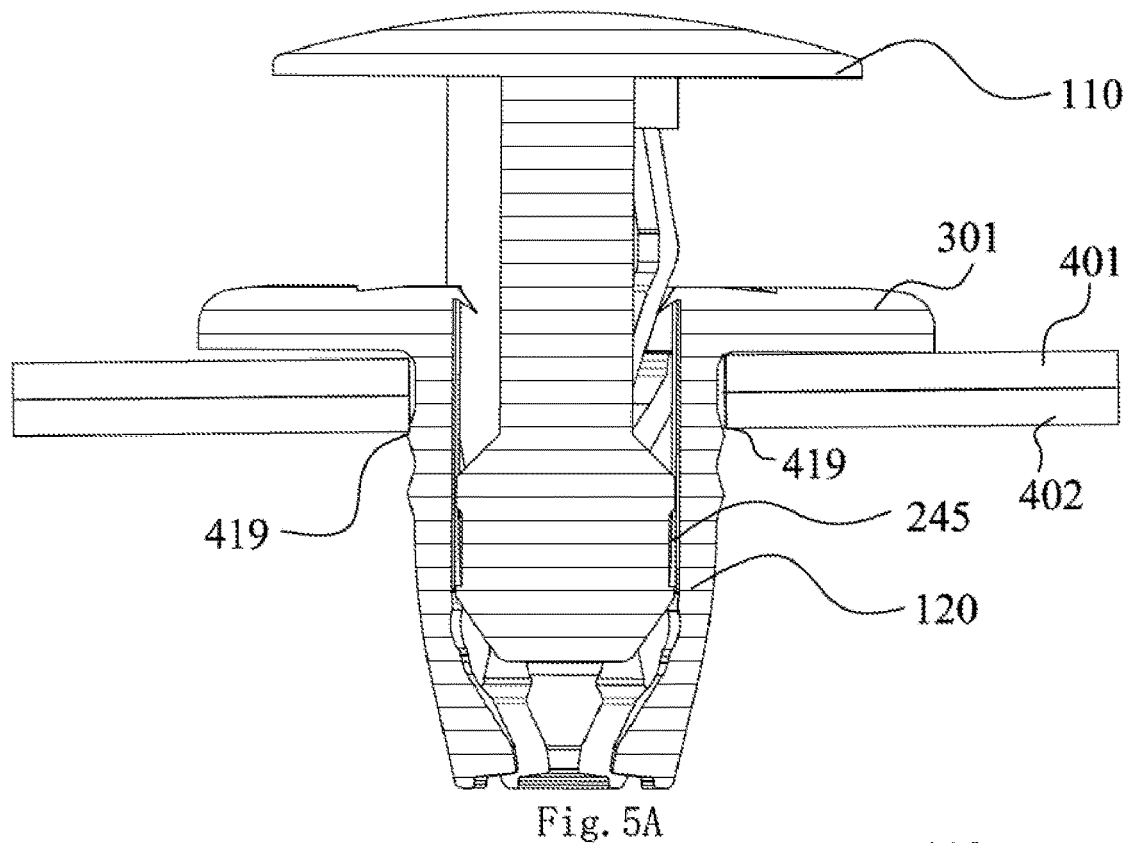
FIG. 5A is a radial cross-sectional view showing that the fastening clip at a ready position is inserted into the two plates of the first thickness.

FIG. 5A shows a cross-sectional view of the fastening clip 100 sheathed in the two plates of the first thickness and at the ready position. As shown in FIG. 5A, the fastening clip 100 is inserted into the hole 411 of the first plate 401 and the hole 412 of the second plate 402, wherein the upper surface of the first plate 401 contacts the lower surface 303 of the base 301. At this time, the fastening clip 100 is at the ready position, then the fastening clip 100 can easily slide in the hole 412 of the second plate, and at this time, the first plate 401 and the second plate 402 are not fastened.

Figure 5B:
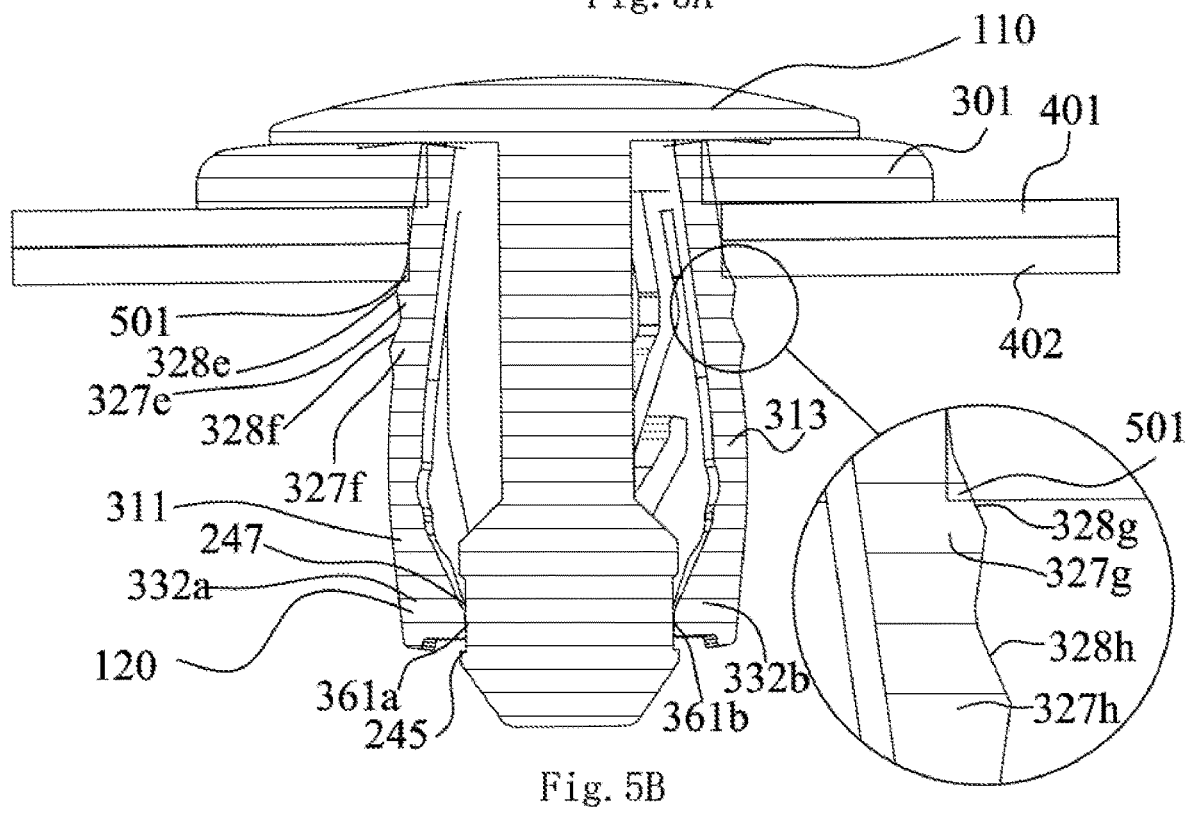
FIG. 5B is a schematic cross-sectional view showing the relationship between the fastening clip at a working position and the two plates of the first thickness.

FIG. 5B shows a cross-sectional view of the relationship between the fastening clip 100 at the working position and the two plates of the first thickness. As shown in FIG. 5B, the lower surface 216 of the head part 211 of the fastening pin 110 is close to the upper surface 302 of the base 301 of the fastening sleeve 120. At this time, the clamping parts 322a, 322b, 322c, 322d are expanded outward, so that the outer side of each retaining wing contacts the lower edge 419 of the hole 412 of the second plate 402 and abuts against the lower edge 419. Thus, the first plate 401 and the second plate 402 are fastened. At the working position of the fastening clip 100, the claws 361a, 361b, 361c, 361d of the fastening sleeve 120 enter the groove 245 of the retaining part 241 of the fastening pin 110 and abut against the groove bottom 247. When the fastening pin 110 has a tendency to move up relative to the fastening sleeve 120, the lower side wall 249 of the groove 245 can prevent the claws 361a, 361b, 361c, 361d from falling off the groove 245, so that the fastening clip 100 is maintained at the working position.

During the change of the fastening clip 100 from the ready position shown in FIG. 5A to the working position shown in FIG. 5B, an operator presses down the fastening pin 110, so that the retaining part 241 contacts the bevels of the clamping parts 322 that are inclined inward, the retaining part 241 pushes the clamping parts 322a, 322b, 322c, 322d outward, each of the two pairs of retaining wings 311, 312, 313, 314 deforms, and the outer side of each retaining wing upper part of the two pairs of retaining wings 311, 312, 313, 314 is inclined outward. When the fastening pin 110 reaches the working position, the outer side of each of the retaining wing upper parts 341a, 341b, 341c, 341d of the two pairs of retaining wings 311, 312, 313, 314 abuts against the lower edge 419 of the hole 412 of the second plate 402, thereby pressing and fastening the first plate 401 and the second plate 402.

The total thickness of at least two plates to be fastened in FIG. 5A and FIG. 5B is a first thickness, and the at least two plates of the first thickness increase the fastening force of the fastening clip 100 to the plates to be fastened through the raised ribs 327e, 327f, 327g, 327h of the first pair of retaining wings 311, 313. FIG. 5B shows the relationship between the fastening clip 100 at the working position and the first plate 401 and the second plate 402. As shown in FIG. 5B, when the fastening clip 100 is inserted into the hole 401 and the hole 412 and reaches the working position, an overlapping portion 501 of the second plate 402 shown in FIG. 5A and each of the two pairs of retaining wings 311, 312, 313, 314 deforms into the hole 412, so that each of the two pairs of retaining wings 311, 312, 313, 314 applies a certain acting force to the second plate 402 to press the second plate 402 and the first plate 401. In the fastening clip without raised ribs, the first plate 401 and the second plate 402 of the first thickness are relatively thin, and the overlapping portions 501 are located at the ends of the retaining wing upper parts 341a, 341b, 341c, 341d of the two pairs of retaining wings 311, 312, 313, 314 that are close to the base 301. Because the retaining wing upper parts 341a, 341b, 341c, 341d are relatively thin and the overlapping portions 501 are small, the portion of each of the two pairs of retaining wings 311, 312, 313, 314 near the hole 412 easily deforms, that is, the acting force generated by the deformation of each retaining wing is small. After the fastening clip reaches the working position, the portion of each of the two pairs of retaining wings 311, 312, 313, 314 below the second plate 402 is extruded into the hole 412 by the lower edge 419 of the hole 412, so that the first plate 401 and the second plate 402 loosen. In an embodiment of the present application, the outer sides of the first pair of retaining wings 311, 313 have raised ribs 327e, 327f, 327g, 327h, so that contact points of the outer sides of the first pair of retaining wings 311, 313 and the lower edge 419 of the hole 412 of the second plate 402 are located on the upper bevels 328e, 328g of the raised ribs 327e, 327g. Compared with a fastening clip without raised ribs, since the tops 331e, 331g of the raised ribs 327e, 327g outward exceed the lower edge 419 of the hole 412 of the second plate 402, the fastening clip with raised ribs needs a larger external force to extrude the tops 331e, 331f into the hole 412, so that the first plate 401 and the second plate 402 are relatively less likely to loosen, that is, the fastening clip 100 will fasten the first plate 401 and the second plate 402 more firmly.

When the fastening pin 110 is inserted into the fastening sleeve 120 until reaching the working position, the applied external force needs to overcome the acting force generated by the deformation of the two pairs of retaining wings 311, 312, 313, 314, and the raised ribs 327e, 327f arranged on the first pair of retaining wings 311, 313 slightly increase the deformation of the first pair of retaining wings 311, 313, so the raised ribs 327e, 327f slightly increase the insertion force of the fastening clip 100. That is, while the fastening clip 100 significantly increases the fastening force to the two plates of the first thickness, the insertion force of the fastening clip 100 is only slightly increased.

In an embodiment of the present application, the raised ribs for the at least two plates of the first thickness are arranged on the first pair of retaining wings 311, 313, but the outer sides of the second pair of retaining wings 312, 314 also abut against the lower edge 419 of the hole 412 and also contribute to the fastening force of the fastening clip 100. In another embodiment, raised ribs for the at least two plates of the first thickness may also be arranged on the second pair of retaining wings 312, 314.

In the embodiment shown in FIG. 5A and FIG. 5B, the lower edge 419 of the hole 412 of the second plate 402 in the plates to be fastened abuts against the bevels 328e, 328g of the upper raised ribs 327e, 327g, plates to be fastened being slightly thicker than the total thickness of the first plate 401 and the second plate 402 will abut against the bevels 328f, 328h of the lower raised ribs 327f, 327h, and similar technical effects can also be achieved. In another embodiment of the present application, the total thickness of the two plates to be fastened is greater than the distance from the lower raised ribs to the lower surface 303 of the base 301, so the plates cannot exactly abut against the bevels of the raised ribs, but the tops 331e, 332g of the raised ribs 327e, 327g or the tops 331f, 331h of the raised ribs 327f, 327h abut against the inner side of the hole 412. Compared with a fastening clip without raised ribs, the deformation of the first pair of retaining wings 311, 313 is larger, and a larger fastening force can also be provided, so that the two fastened plates are unlikely to loosen and fall off. When the at least two plates of the first thickness are fastened, the two pairs of retaining wings of the fastening clip 100 jointly provide a fastening force, but the first pair of retaining wings 311, 313 provide a larger fastening force than the second pair of retaining wings 312, 314.

Figure 6:
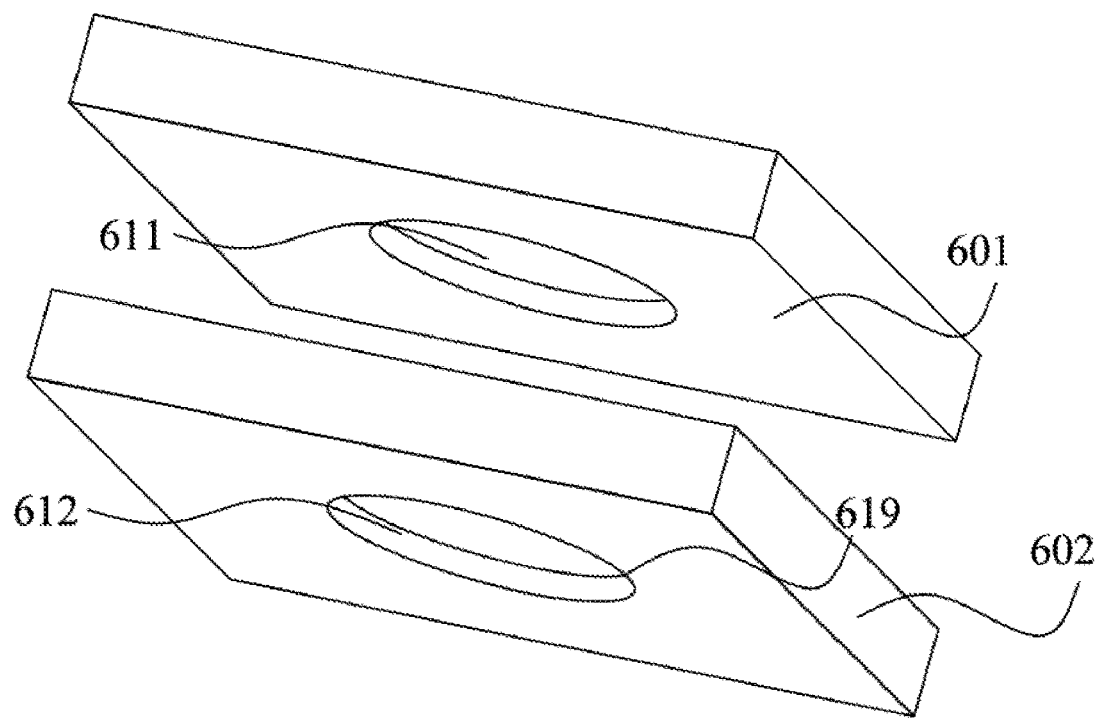
FIG. 6 is a perspective view of two plates of a second thickness.

FIG. 6 shows two plates of a second thickness being the total thickness. As shown in FIG. 6, the total thickness of the first plate 601 and the second plate 602 is a second thickness. The first plate 601 and the second plate 602 of the second thickness will cooperate with the raised ribs 337e, 337f, 337g, 337h on the second pair of retaining wings 312, 314 to strengthen the fastening of the fastening clip 100 on the first plate 601 and the second plate 602. The first plate 601 and the second plate 602 have a hole 611 and a hole 612, respectively. When the plates 601 and 602 need to be fastened, the hole 611 is first aligned with the hole 612, then the fastening clip 100 in FIG. 1A at the ready position is inserted into the hole 611 and the hole 612, and the fastening pin 110 is pressed down to fasten the plate 601 and the plate 602. The diameters of the hole 611 and the hole 612 are set to be equal to or slightly larger than the outer diameter of the fastening sleeve 120 at the ready position shown in FIG. 1A, so that the fastening clip 100 can be easily inserted into the hole 411 and the hole 412. The hole 612 of the lower second plate 602 matches the size of the fastening clip 100, so that when the fastening clip 100 is at the working position, the fastening sleeve 120 can abut against a lower edge 619 of the hole 612 to fasten the first plate 601 and the second plate 602.

Figure 7A:
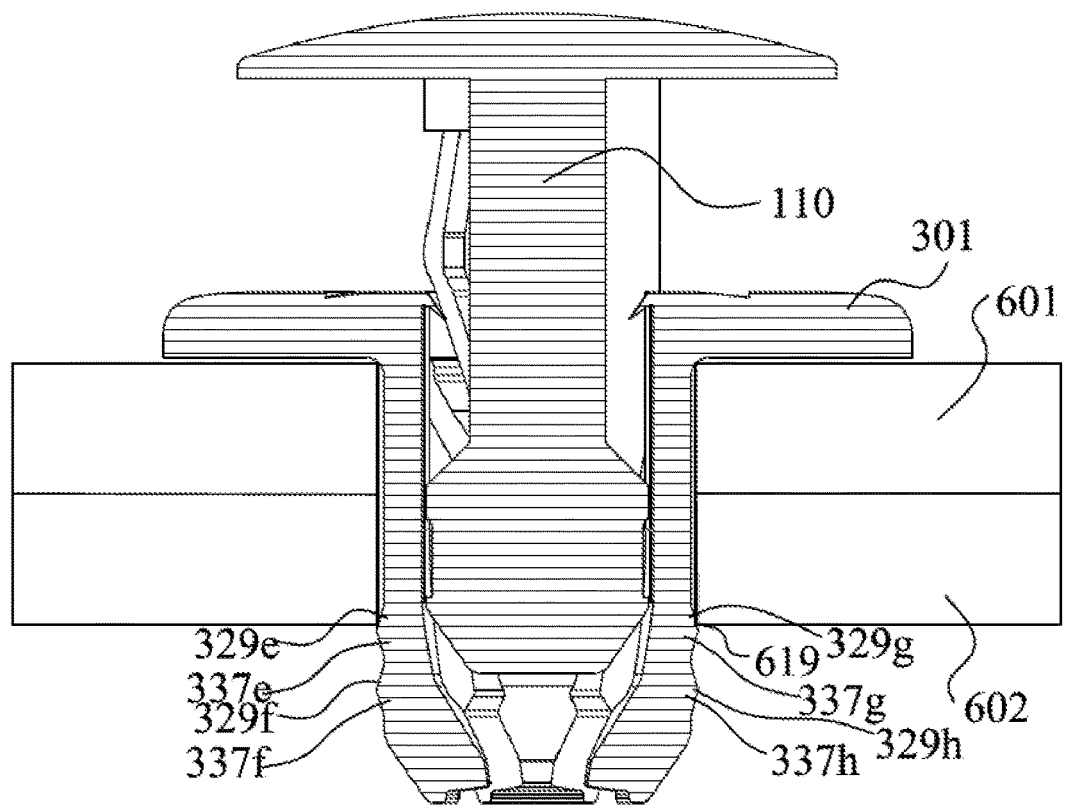
FIG. 7A is a radial cross-sectional view showing that the fastening clip at a ready position is inserted into the two plates of the second thickness.

FIG. 7A shows a cross-sectional view of the fastening clip 100 sheathed in the holes of the two plates of the second thickness and at the ready position. As shown in FIG. 7A, the fastening clip 100 is inserted into the hole 611 of the first plate 601 and the hole 612 of the second plate 602, wherein the upper surface of the first plate 601 contacts the lower surface 303 of the base 301. At this time, the fastening clip 100 is at the ready position, then the fastening clip 100 can easily slide in the hole 612 of the plate, and at this time, the first plate 601 and the second plate 602 are not fastened.

Figure 7B:
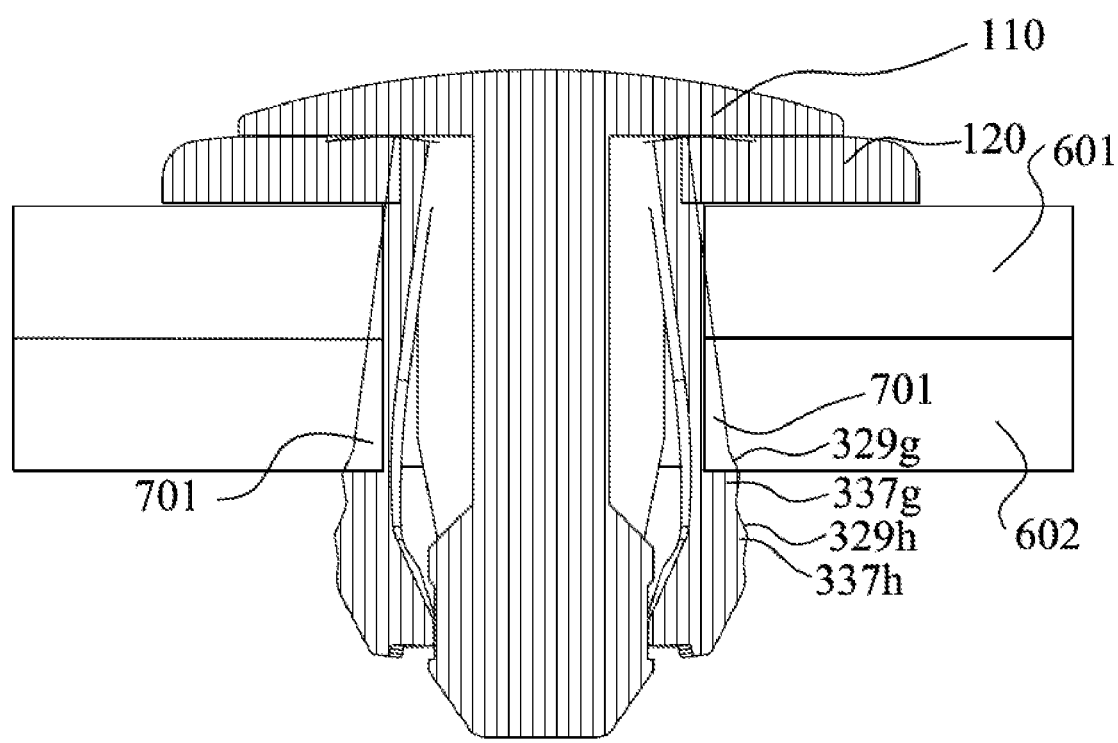
FIG. 7B is a schematic cross-sectional view showing the relationship between the fastening clip at a working position and the two plates of the second thickness.

FIG. 7B shows a cross-sectional view of the fastening clip 100 sheathed in the two plates of the second thickness and at the working position. As shown in FIG. 7B, the lower surface 216 of the head part 211 of the fastening pin 110 is close to the upper surface 302 of the base 301 of the fastening sleeve 120. At this time, the clamping parts 322a, 322b, 322c, 322d are expanded outward, so that the outer side of each retaining wing contacts the lower edge 619 of the hole 612 of the second plate 602 and abuts against the lower edge 619. Thus, the first plate 601 and the second plate 602 are fastened. The total thickness of the two plates of the second thickness is large, and the lower edge 619 of the hole 612 of the second plate 602 contacts the retaining wing lower parts 342c, 342d of the second pair of retaining wings 312, 314.

The total thickness of at least two plates to be fastened in FIG. 7A and FIG. 7B is a second thickness. FIG. 7B shows the relationship between the fastening clip 100 at the working position and the first plate 601 and the second plate 602. As shown in FIG. 7B, when the fastening clip 100 is inserted into the hole 601 and the hole 612 and reaches the working position, an overlapping portion 701 of the second plate 602 shown in FIG. 7A and each of the two pairs of retaining wings 311, 312, 313, 314 deforms into the hole 612, so that each of the two pairs of retaining wings 311, 312, 313, 314 applies a certain acting force to the second plate 602 to press the second plate 602 and the first plate 601.

During the change of the fastening clip 100 from the ready position shown in FIG. 7A to the working position shown in FIG. 7B, the operator presses down the fastening pin 110, so that the retaining part 241 contacts the bevels of the clamping parts 322a, 322b, 322c, 322d that are inclined inward, the retaining part 241 pushes the clamping parts 322a, 322b, 322c, 322d outward, and the outer side of each of the two pairs of retaining wings 311, 312, 313, 314 is extruded by the holes 611 and 612 to deform. When the fastening pin 110 reaches the working position, the outer side of each retaining wing upper part of the two pairs of retaining wings 311, 312, 313, 314 abuts against the lower edge 619 of the hole 612 of the second plate 602, thereby pressing and fastening the first plate 601 and the second plate 602.

As shown in FIG. 7B, when the two plates 601, 602 of the second thickness are fastened, the overlapping portions 701 are relatively large, and the overlapping portions 701 are close to the thicker retaining wing lower parts 342a, 342b, 342c, 342d, so a large external force is required for the two pairs of retaining wings 311, 312, 313, 314 to deform and the overlapping portions 701 to enter the hole 612. That is to say, in the conventional fastening clip, a large pushing force is required. In an embodiment of the present application, the thickness of the retaining wing lower parts 342a, 342b of the first pair of retaining wings 311, 313 is smaller than the thickness of the retaining wing lower parts 342c, 342d of the second pair of retaining wings 312, 314, thereby reducing the external force required for the second pair of retaining wings 312, 314 to deform into the hole 612, that is, reducing the pushing force of the fastening clip 100. At the same time, the outer sides of the second pair of retaining wings 312, 314 have raised ribs 337e, 337f, 337g, 337h. Similar to the raised ribs 327e, 327f, 327g, 327h of the first pair of retaining wings 311, 313, the raised ribs 337e, 337f, 337g, 337h can increase the fastening force of the fastening clip 100 to the first plate 601 and the second plate 602 of the second thickness, so that the first plate 601 and the second plate 602 are unlikely to loosen. The principle that the raised ribs 337e, 337f, 337g, 337h of the second pair of retaining wings increase the fastening force is the same as the principle that the raised ribs 327e, 327f, 327g, 327h of the first pair of retaining wings 311, 313 increase the fastening force, and details are not described herein again.

When the fastening clip 100 is used to fasten the at least two plates of the second thickness, the clamping parts 322a, 322b of the first pair of retaining wings 311, 313 are thinned, so that when the fastening clip 100 is inserted into the plates to be fastened of the second thickness, the first pair of retaining wings 311, 313 are more likely to deform, and the pushing force required for the fastening clip 100 to reach the working position is reduced. While the pushing force is reduced, in order to prevent the two plates from loosening, the raised ribs 337e, 337f, 337g, 337h are also arranged on the outer sides of the second pair of retaining wings 312, 314. The positions of the raised ribs 337e, 337f, 337g, 337h match the thickness of the plates to be fastened of the second thickness, and the raised ribs 337e, 337f, 337g, 337h increase the fastening force of the fastening clip 100 to the at least two plates of the second thickness. That is, the thinning of the clamping parts 322a, 322b of the first pair of retaining wings 311, 313 and the arrangement of the raised ribs 337e, 337f, 337g, 337h on the outer sides of the second pair of retaining wings 312, 314 ensure that, when the fastening clip 100 fastens the at least two plates of the second thickness, the pushing force is reduced, and the fastening force remains unchanged or decreases a little, which can meet the requirements of the fastening force.

Similarly, in the embodiment shown in FIG. 7A and FIG. 7B, the lower edge 619 of the hole 612 of the second plate 602 in the plates to be fastened abuts against the bevels 328e, 328g of the upper raised ribs 327e, 327g. In another embodiment of the present application, plates to be fastened being slightly thicker than the total thickness of the first plate 601 and the second plate 602 will abut against the bevels 329f, 329h of the lower raised ribs 337f, 337h, and similar technical effects can also be achieved. In another embodiment of the present application, the total thickness of the two plates to be fastened is greater than the distance from the lower raised ribs to the lower surface of the base 301, so the plates cannot exactly abut against the bevels of the raised ribs, but the tops 333e, 333g of the raised ribs 337e, 337g or the tops 333f, 333h of the raised ribs 337f, 337h abut against the inner side of the hole 612. Compared with a fastening clip without raised ribs, the deformation of the second pair of retaining wings 312, 314 is larger, so that the two fastened plates are also unlikely to loosen and fall off. When the at least two plates of the second thickness are fastened, the two pairs of retaining wings of the fastening clip 100 jointly provide a fastening force, but the contribution of the second pair of retaining wings 312, 314 to the fastening force of the fastening clip 100 is greater than the contribution of the first pair of retaining wings 311, 313 to the fastening force of the fastening clip 100.

Figure 8:
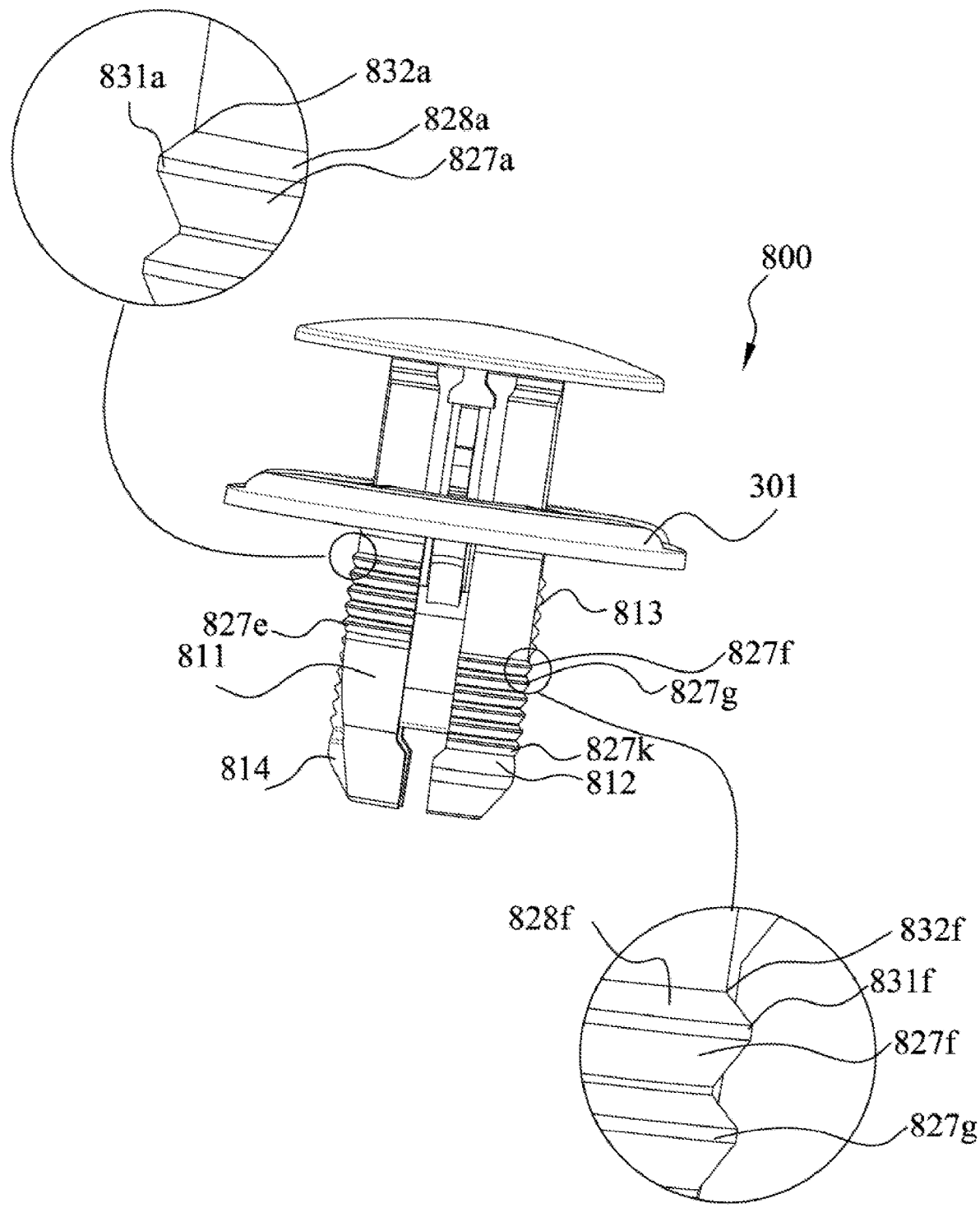
FIG. 8 is a perspective view of a fastening clip according to another embodiment of the present application.

FIG. 8 is a perspective view of a fastening clip according to another embodiment of the present application. The embodiment shown in FIG. 8 is similar to the embodiment shown in FIG. 1A, except that the number and size of raised ribs on two pairs of retaining wings 811, 812, 813, 814 of a fastening clip 800 in FIG. 8 are different from those of the fastening clip 100 shown in FIG. 1A. As shown in FIG. 8, similar to the embodiment shown in FIG. 1A, the structure of a first pair of retaining wings 811, 813 of the fastening clip 800 is symmetrical with respect to a central axis of the fastening clip, and the structure of a second pair of retaining wings 812, 814 is symmetrical with respect to the central axis of the fastening clip. The structure of the first pair of retaining wings will be described below by taking the retaining wing 811 as an example, and the structure of the second pair of retaining wings will be described by taking the retaining wing 812 as an example.

An outer side of the retaining wing 811 has five raised ribs 827a-827e extending in a circumferential direction, and the five raised ribs are arranged side by side and located at an end of the retaining wing 811 close to the base 301. The structure of each of the five raised ribs is the same, and the structure of the raised rib on the outer side of the retaining wing 811 will be described below by taking the first rib 827a closest to the base 301 as an example. Similar to the fastening clip 100, the raised rib 827a has an upper bottom 832a and a top 831a successively from top to bottom, the raised rib 827a gently transitions from the upper bottom 832a to the top 831a to form an upper bevel 828a, and the upper bevel 828a is used to abut against at least two plates. The retaining wing 811 is used to cooperate with at least two plates with a relatively thin thickness. The distance between the top of each raised rib on the retaining wing 811 and the top of the adjacent raised rib is a predetermined value D, that is to say, the five raised ribs on the retaining wing 811 are evenly distributed in an axial direction of the fastening clip.

An outer side of the retaining wing 812 has six raised ribs 827f-827k extending in the circumferential direction, and the six raised ribs are arranged side by side and located at an end of the retaining wing 811 away from the base 301. The structure of each of the six raised ribs 827f-827k is the same, and the structure of the raised rib on the outer side of the retaining wing 812 will be described below by taking the raised rib 827f closest to the base 301 as an example. Similar to the raised rib 827a, the raised rib 827f has an upper bottom 832f and a top 831f successively from top to bottom, the raised rib 827f gently transitions from the upper bottom 832f to the top 831f to form an upper bevel 828f, and the upper bevel 828f is used to abut against at least two plates. The retaining wing 812 is used to cooperate with at least two plates with a relatively thick thickness. The distance between the top of each raised rib on the retaining wing 812 and the top of the adjacent raised rib is equal to the predetermined value D, that is to say, the six raised ribs on the retaining wing 812 are evenly distributed in the axial direction of the fastening clip. In addition, the distance between the top of the highest raised rib 827f among the six raised ribs at the outer side of the retaining wing 812 and the top of the lowest raised rib 827e among the five raised ribs at the outer side of the retaining wing 811 is equal to the predetermined value D, such that in the axial direction of the fastening clip 800, respective raised ribs on the retaining wing 811 and the retaining wing 812 are evenly distributed. Similarly, in the axial direction of the fastening clip 800, respective raised ribs on the retaining wing 813 and the retaining wing 814 are evenly distributed. Compared with the fastening clip 100, the fastening clip 800 can adapt to at least two plates of more types of thicknesses.

In another embodiment, the height of the highest raised rib among the plurality of raised ribs at the outer side of the retaining wing 812 is higher than the height of the lowest raised rib among the plurality of raised ribs at the outer side of the retaining wing 811, that is to say, projections in a radial direction of the plurality of raised ribs at the outer side of the retaining wing 812 overlap with projections in the radial direction of the plurality of raised ribs at the outer side of the retaining wing 811. The above embodiment can also achieve the technical effect of the fastening clip 800.

In the axial direction of the fastening clip 800, a distance A between the top of the highest raised rib 827a among the plurality of raised ribs at the outer side of the first pair of retaining wings 811, 813 and the bottom of the lowest raised rib 827k among the plurality of raised ribs at the outer side of the first pair of retaining wings 812, 814 accounts for more than 65% of the length of the two pairs of retaining wings 811, 812, 813, 814.

When at least two plates are fastened, the fastened plate abuts against the upper bevel of the raised rib, and the raised ribs in the fastening clip 800 are large in number and tight in arrangement, and can adapt to fastened plates of various thicknesses. In other embodiments, the number and size of the raised ribs can be designed according to actual needs.

The fastening clip in the present application can adapt to plates of different thicknesses, for example, plates having a total thickness of 2 to 7 mm, so that when the fastening clip clamps at least two thin plates of a first thickness, the fastening force of the fastening clip to the at least two plates is improved to prevent the two plates from loosening. When at least two thick plates of a second thickness are fastened, there is a small insertion force while the fastening force is guaranteed to meet the requirements. Of course, the size of the fastening clip in the present application can also be increased or decreased proportionally, so as to adapt to at least two thicker or thinner plates.

Although only some features of the present invention are illustrated and described herein, those skilled in the art may make various improvements and changes. Therefore, it should be understood that the appended claims are intended to cover all the foregoing improvements and changes that fall within the substantial spirit and scope of the present invention.

The invention claimed is:

1. A fastening clip, comprising:
a fastening pin, the fastening pin having a head part and a pin part, the pin part extending downward from the head part, and a distal end of the pin part forming a retaining part; and
a fastening sleeve, the fastening sleeve comprising a base and two pairs of retaining wings, wherein each pair of retaining wings is arranged opposite to each other, the base defines a hole, the pin part is detachably inserted into the hole, the two pairs of retaining wings respectively extend downward from a lower surface of the base and are circumferentially distributed around the center of the hole, and an inner side of a lower part of each of the two pairs of retaining wings is inclined inward to form a clamping part configured to cooperate with the retaining part of the fastening pin, wherein at least one outer side of at least one of the two pairs of retaining wings have at least one raised rib extending in a circumferential direction, wherein the two pairs of retaining wings comprise a first pair of retaining wings and a second pair of retaining wings, and wherein on a first radial section a first distance between a first inner surface and a second inner surface of the clamping parts of the first pair of retaining wings of the two pairs of retaining wings is greater than a second distance between a third inner surface and a fourth inner surface of the clamping parts of the second pair of retaining wings.

2. The fastening clip of claim 1, wherein the first pair of retaining wings is provided with one or more raised ribs adjacent to a first upper end and a second upper end of the first pair of retaining wings, and the second pair of retaining wings is provided with one or more raised ribs adjacent to a first lower end and a second lower end of the second pair of retaining wings.

3. The fastening clip of claim 2, wherein the raised ribs at the first upper end and the second upper end of the first pair of retaining wings extend in a second radial section and the one or more raised ribs at the first lower end and the second lower end of the second pair of retaining wings extend in a third radial section positioned farther from the base than the second radial section.

4. The fastening clip of claim 1, wherein on the first radial section, a third distance between a first outer side and a second outer side of the at least one outer sides of the clamping parts of the first pair of retaining wings of the two pairs of retaining wings is smaller than a fourth distance between a third outer side and a fourth outer side of the at least one outer sides of the clamping parts of the second pair of retaining wings.

5. The fastening clip of claim 2, wherein on the first radial section, a first thickness of the clamping parts of the first pair of retaining wings is smaller than a second thickness of the clamping parts of the second pair of retaining wings.

6. The fastening clip of claim 2, wherein a claw is arranged on each of the first inner surface, the second inner surface, the third inner surface, and the fourth inner surface of the clamping parts to abut against the retaining part, and the one or more raised ribs at the first lower end and the second lower end of the second pair of retaining wings are located above the claws.

7. The fastening clip of claim 6, wherein the one or more raised ribs at the first upper end and the second upper end of the first pair of retaining wings are farther from the claws of the first pair of retaining wings than the one or more raised ribs at the first lower end and the second lower end of the second pair of retaining wings.

8. The fastening clip of claim 2, wherein each of the first pair of retaining wings and each of the second pair of retaining wings are respectively provided with a plurality of raised ribs arranged side by side.

9. The fastening clip of claim 8, wherein the plurality of raised ribs on each of the first pair of retaining wings and the plurality of raised ribs on each of the second pair of retaining wings are evenly distributed in an axial direction of the fastening clip.

10. The fastening clip of claim 1, wherein each of the at least one raised ribs have upper bevels inclined downward and outward.

11. The fastening clip of claim 1, wherein each of the first pair of retaining wings and each of the second pair of retaining wings are respectively provided with two raised ribs arranged side by side.

12. The fastening clip of claim 1, wherein a guide rib is arranged on an outer side of the pin part, a guide groove is defined by the fastening sleeve, and when the pin part is inserted into the hole, the guide rib is received in the guide groove, and the fastening pin cannot rotate relative to the fastening sleeve.

13. A fastening clip, comprising:
a fastening pin, the fastening pin having a head part and a pin part, the pin part extending downward from the head part, and a distal end of the pin part forming a retaining part; and
a fastening sleeve, the fastening sleeve comprising a base and two pairs of retaining wings, wherein each pair of retaining wings is arranged opposite to each other, the base defines a hole, the pin part is detachably inserted into the hole, the two pairs of retaining wings respectively extend downward from a lower surface of the base and are circumferentially distributed around the center of the hole, and an inner side of a lower part of each of the retaining wings of the two pairs of retaining wings is inclined inward to form a clamping part configured to cooperate with the retaining part of the fastening pin,
wherein each of the retaining wings of the two pairs of retaining wings have an outer side and comprise a first pair of retaining wings and a second pair of retaining wings,
wherein each of the first pair of retaining wings is provided with two or more first ribs that radially extend outwardly from the hole, and each of the second pair of retaining wings is provided with two or more second ribs that radially extend outwardly from the hole,
wherein each of the first ribs are closer to the base than each of the second ribs.

14. The fastening clip of claim 13, wherein on a first radial section, a first distance between a first inner surface and a second inner surface of the clamping parts of the first pair of retaining wings of the two pairs of retaining wings is greater than a second distance between a third inner surface and a fourth inner surface of the clamping parts of the second pair of retaining wings.

15. The fastening clip of claim 14, wherein on the first radial section, a third distance between a first outer side and a second outer side of the clamping parts of the first pair of retaining wings of the two pairs of retaining wings is smaller than a fourth distance between a third outer side and a fourth outer side of the clamping parts of the second pair of retaining wings.

16. The fastening clip of claim 13, wherein the lower part of each of the two pairs of retaining wings remains inclined inwardly when engaged with the pin part.

17. A fastening clip, comprising:
a fastening pin, the fastening pin having a head part and a pin part, the pin part extending downward from the head part, and a distal end of the pin part forming a retaining part; and
a fastening sleeve, the fastening sleeve comprising a base and two pairs of retaining wings,
wherein each pair of retaining wings is arranged opposite to each other, the base defines a hole, the pin part can be detachably inserted into the hole, the two pairs of retaining wings respectively extend downward from a lower surface of the base and are circumferentially distributed around the center of the hole, and an inner side of a lower part of each retaining wing of the two pairs of retaining wings is inclined inwardly to form a clamping part configured to cooperate with the retaining part of the fastening pin, wherein an outer side of at least one retaining wing of the two pairs of retaining wings has at least one raised rib extending in a circumferential direction, wherein a lower part of each retaining wing of the two pairs of retaining wings remains inclined inwardly when engaged with the pin part, wherein the two pairs of retaining wings comprise a first pair of retaining wings and a second pair of retaining wings, and wherein on a first radial section, a first thickness of each of the respective clamping parts of the first pair of retaining wings is smaller than a second thickness of each of the respective clamping parts of the second pair of retaining wings.

18. The fastening clip of claim 17, wherein on the first radial section, a first distance between a first inner surface and a second inner surface of the clamping parts of the first pair of retaining wings of the two pairs of retaining wings is greater than a second distance between a third inner surface and a fourth inner surface of the clamping parts of the second pair of retaining wings.

19. The fastening clip of claim 18, wherein on the first radial section, a third distance between a first outer side and a second outer side of the clamping parts of the first pair of retaining wings of the two pairs of retaining wings is smaller than a fourth distance between a third outer side and a fourth outer side of the clamping parts of the second pair of retaining wings.

20. The fastening clip of claim 17, wherein each retaining wing of the first pair of retaining wings is provided with a plurality of raised first ribs that radially extend outwardly away from the hole, and the second pair of retaining wings is provided with a plurality of raised second ribs that radially extend outwardly away from the hole, wherein each of the plurality of raised first ribs are closer to the base than each of the plurality of raised second ribs.

* * * * *